3,101,357
19-HALO ANDROSTENES

Albert Bowers, Mexico City, Mexico, assignor to Syntex Corporation, Panama, Panama, a corporation of Panama
No Drawing. Filed June 12, 1962, Ser. No. 201,803
Claims priority, application Mexico Mar. 9, 1962
12 Claims. (Cl. 260—397.4)

The present invention relates to novel cyclopentanophenanthrene derivatives and to a process for the production thereof.

More particularly the present invention relates to novel 19-halo-$\Delta^5$-androsten-3$\beta$-ol derivatives.

The novel compounds of the present invention are represented by the following formulas:

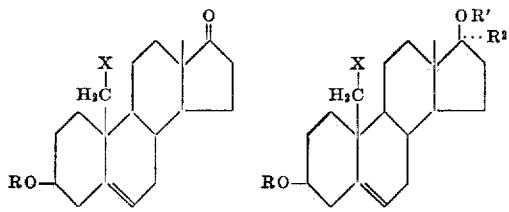

In the above formulas R and $R^1$ each represent hydrogen or a hydrocarbon carboxylic acyl group of less than 12 carbon atoms; $R^2$ represents hydrogen, a lower alkyl, lower alkenyl or lower alkinyl and X represents fluorine or chlorine.

The acyl group is derived from hydrocarbon carboxylic acids containing less than 12 carbon atoms which may be saturated or unstaurated, of straight, branched, cylic or cylic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by the above formulas exhibit anabolic-androgenic activities and inhibit the production of pituitary gonadotrophic hormones and A.C.T.H. In addition, they have anti-estrogenic properties and lower the blood, liver and adrenal cholesterol levels. Furthermore, they are useful in the control of fertility and psychotic conditions and are appetite stimulants.

The novel compounds of the present invention are prepared by the process illustrated by the following equations:

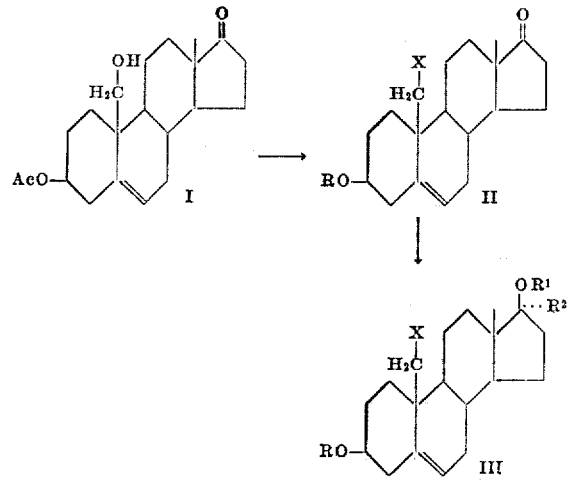

In the above formulas, R, $R^1$, $R^2$ and X have the same meaning as previously set forth.

In practicing the process outlined above, the starting $\Delta^5$-androstene-3$\beta$,19-diol-17-one 3-acetate (I), (produced in accordance with my copending application Serial No. 194,716, filed May 14, 1962, now U.S. Patent No. 3,065,228) is treated with an $\alpha$-fluorinated amine, such as 2-chloro-1,1,2-trifluoro-triethylamine, in a non-polar organic solvent, to produce 19-fluoro-$\Delta^5$-androsten-3$\beta$-ol-17-one acetate (II: X=fluorine).

Alternatively, upon conventional treatment of the starting compound (I) with tosyl chloride in pyridine, there is obtained the corresponding 19-tosylate which is treated with an alkali metal halide, such as lithium chloride or fluoride, or silver fluoride, in a suitable solvent, such as dimethylformamide or acetonitrile, thus affording the corresponding 19-fluoro or chloro-$\Delta^5$-androsten-3$\beta$-ol-17-one acetate (II: R=acetyl) which upon conventional saponification affords the corresponding 3$\beta$-free alcohol (II: R=H).

Reduction of the 17-keto 3-acetates (II: R=acetyl) with a double metal hydride, such as sodium borohydride, affords the corresponding 19-halo-$\Delta^5$-androstene-3$\beta$,17$\beta$-diol 3-acetate (III: $R^1=R^2$=H, R=acyl) which upon conventional saponification with a base yields the corresponding 19-halo-$\Delta^5$-androstene-3$\beta$,17$\beta$-diol (III: R=$R^1=R^2$=H).

The 19-fluoro or chloro-$\Delta^5$-androsten-3$\beta$-ol-17-one acetate (II) is treated with a lower (alkyl, alkenyl or alkinyl) magnesium halide, such as methyl magnesium bromide, vinyl magnesium bromide or ethinyl magnesium bromide, in a solvent inert to the reagent, e.g. ether, to produce the corresponding 19-halo-17$\alpha$-(alkyl, alkenyl or alkinyl)-$\Delta^5$-androstene-3$\beta$,17$\beta$-diol [III: R=$R^1$=H, $R^2$=lower (alkyl, alkenyl or alkinyl)].

The secondary hydroxyls of the compounds of the present invention, namely the 3-$\beta$-hydroxyl group and the 17-hydroxyl group of the 17$\alpha$-unsubstituted derivatives are conventionally acylated in pyridine with an acylating agent, such as an anhydride derived from a hydrocarbon carboxylic acid of the type defined previously, thus affording the corresponding acylates.

The tertiary hydroxyls of the compounds of the present invention, namely the 17$\beta$-hydroxyl group of the 17$\alpha$-substituted derivatives, are conventionally esterified in the presence of p-toluenesulfonic acid, with an acylating agent, e.g. acetic anhydride or caproic anhydride, to produce the corresponding 17-esters.

The following specific examples serve to illustrate, but are not intended to limit the scope of the present invention:

Example I

To a solution of 5 g. of $\Delta^5$-androstene-3$\beta$,19-diol-17-one 3-acetate in 25 cc. of methylenechloride, were added 5 g. of 2-chloro-1,1,2-trifluoro triethyl amine (Yarovenko et al. Journal of General Chemistry of the U.S.S.R., 2125, 29 (1959)). 15 cc. of the solvent were evaporated under anhydrous conditions and the resulting mixture was kept overnight at room temperature. The reaction mixture was evaporated to dryness and the residue was chromatographed on alumina, thus yielding compound No. 1, namely, 19-fluoro-$\Delta^5$-androsten-3$\beta$-ol-17-one acetate.

Example II

A solution of 3.4 g. of $\Delta^5$-androstene-3$\beta$,19-diol-17-one 3-acetate in 20 cc. of a mixture chloroform-pyridine 9:1 was cooled to 0° C. and mixed with 1.4 g. of tosyl chloride which was added in small portions. The reaction mixture was kept for 14 hours at 0° C. and then it was washed with dilute hydrochloric acid, water and sodium bicarbonate solution and the chloroform was evaporated under vacuum. The residue, consisted of the crude 19-tosylate. The crude product was dried in vacuum, dissolved in 20 cc. of acetonitrile and treated dropwise with 1.4 g. of silver fluoride dissolved in 3 cc. of water. After a short time, silver iodide started to separate leaving the 19-fluoro derivative in solution. The mixture was kept for 24 hours at room temperature and filtered. Concentration of the filtrate under vacuum gave a crude product which after crystallization from methanol-acetone yielded 19-fluoro-$\Delta^5$-androsten-3β-ol-17-one acetate, identical with the final product of the foregoing example.

Example III

A solution of 5 g. of $\Delta^5$-androstene-3β,19-diol-17-one 3-acetate in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 19-tosylate of the starting compound.

A suspension of 10 g. of lithium fluoride in 50 cc. of dimethyl formamide was heated to boiling and then a solution of 2 g. of the crude tosylate in 10 cc. of dimethyl formamide was added. The mixture was refluxed for 5 hours, cooled and poured into water. The formed precipitate was filtered off and crystallized to give 19-fluoro-$\Delta^5$-androsten-3β-ol-17-one acetate, identical with the final products of the above examples.

Example IV $\Delta^5$-androstene-3β,19-diol-17-one 3-acetate was treated following the procedure described in Example III, except that lithium chloride was used instead of lithium fluoride, thus affording 19-chloro-$\Delta^5$-androsten-3β-ol-17-one acetate (compound No. 2).

Example V

A solution of 2 g. of sodium borohydride in 30 cc. of methanol was added with stirring to a solution of 2 g. of 19-fluoro-$\Delta^5$-androsten-3β-ol-17-one acetate (cpd. No. 1) in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 19-fluoro-$\Delta^5$-androstene-3β,17β-diol 3-acetate (cpd. No. 3).

19-chloro-$\Delta^5$-androsten-3β-ol-17-one acetate (cpd. No. 2) was treated following the same procedure, thus yielding 19-chloro-$\Delta^5$-androstene-3β,17β-diol-3-acetate (cpd. No. 4).

Example VI

A solution of 5 g. of 19-fluoro-$\Delta^5$-androsten-3β-ol-17-one acetate (cpd. No. 1) in 250 cc. of thiophene-free benzene was treated with 27.5 cc. of 4N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 19-fluoro - 17α - methyl-$\Delta^5$-androstene-3β,17β-diol (cpd. No. 5).

19-chloro-$\Delta^5$-androsten-3β-ol-17-one acetate (cpd. No. 2) was treated under exactly the same conditions, thus furnishing 19-chloro - 17α - methyl-$\Delta^5$-androstene-3β,17β-diol (cpd. No. 6).

Example VII

The compounds Nos. 1 and 2 were treated following the procedure described in Example VI, except that methylmagnesium bromide was substituted by vinyl magnesium bromide thus affording respectively: 19-fluoro-17α-vinyl-$\Delta^5$-androstene-3β,17β-diol (cpd. No. 7) and 19-chloro-17α-vinyl-$\Delta^5$-androstene-3β,17β-diol (cpd. No. 8).

Example VIII

The compounds Nos. 1 and 2 were treated in accordance with Example VI, but using ethinyl magnesium bromide instead of methyl magnesium bromide, thus furnishing respectively: 19-fluoro-17α-ethinyl-$\Delta^5$-androstene-3β,17β-diol (cpd. No. 9) and 19-chloro-17α-ethinyl-$\Delta^5$-androstene-3β,17β-diol (cpd. No. 10).

Example IX

A suspension of 1 g. of 19-fluoro-$\Delta^5$-androstene-3β,17β-diol 3-acetate (cpd. No. 3) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19-fluoro-$\Delta^5$-androstene-3β,17β-diol (cpd. No. 11).

19-chloro - $\Delta^5$ - androstene-3β,17β-diol 3-acetate (cpd. No. 4) was treated by the same procedure, thus affording 19-chloro-$\Delta^5$-androstene-3β,17β-diol (cpd. No. 12).

Example X

A mixture of 1 g. of 19-fluoro-17α-methyl-$\Delta^5$-androstene-3β,17β-diol (cpd. No. 5, 4 cc. of pyridine and 2 cc. of propionic anhydride was kept at room temperature overnight, poured into ice water, the formed precipitate was filtered, washed with water and dried. Crystallization from acetone-hexane gave 19-fluoro-17α-methyl-$\Delta^5$-androstene-3β,17β-diol 3-propionate (cpd. No. 13).

The compounds Nos. 6, 7, 8, 9 and 10 were treated following the same procedure thus affording respectively:

Cpd. No.—
- (14) 19-chloro-17α-methyl-$\Delta^5$-androstene-3β,17β-diol 3-propionate.
- (15) 19-fluoro-17α-vinyl-$\Delta^5$-androstene-3β,17β-diol-3-propionate.
- (16) 19-chloro-17α-vinyl-$\Delta^5$-androstene-3β,17β-diol-3-propionate.
- (17) 19-fluoro-17α-ethinyl-$\Delta^5$-androstene-3β,17β-diol-3-propionate.
- (18) 19-chloro-17α-ethinyl-$\Delta^5$-androstene-3β,17β-diol-3-propionate.

Example XI 19-fluoro-$\Delta^5$-androstene-3β,17β-diol 3-acetate (cpd. No. 3) and 19-chloro-$\Delta^5$-androstene-3β,17β-diol 3-acetate (cpd. No. 4) were treated following the procedure of Example X, thus affording respectively: 19-fluoro-$\Delta^5$-androstene - 3β,17β - diol 3 - acetate - 17 - propionate (cpd. No. 19) and 19-chloro-$\Delta^5$-androstene-3β,17β-diol 3-acetate-17-propionate (cpd. No. 20).

Example XII

To a solution of 5 g. of 19-fluoro-17α-methyl-$\Delta^5$-androstene-3β,17β-diol 3-propionate (cpd. No. 13) in 100 cc. of anhydrous benzene there were added 1 g. of p-toluene-sulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-fluoro-17α-methyl-$\Delta^5$-androstene-3β,17β-diol 3-propionate-17-caproate (cpd. No. 21).

The compounds Nos. 14, 15, 16, 17 and 18 were treated in accordance with the above procedure, thus affording respectively:

Cpd. No.—
(22) 19-chloro-17α-methyl-Δ⁵-androstene-3β,17β-diol 3-propionate-17-caproate.
(23) 19-fluoro-17α-vinyl-Δ⁵-androstene-3β,17β-diol 3-propionate-17-caproate.
(24) 19-chloro-17α-vinyl-Δ⁵-androstene-3β,17β-diol 3-propionate-17-caproate.
(25) 19-fluoro-17α-ethinyl-Δ⁵-androstene-3β,17β-diol 3-propionate-17-caproate.
(26) 19-chloro-17α-ethinyl-Δ⁵-androstene-3β,17β-diol 3-propionate-17-caproate.

*Example XIII*

The compounds Nos. 11 and 12 were treated following the procedure described in Example X, thus affording respectively: 19-fluoro-Δ⁵-androstene-3β,17β-diol dipropionate (cpd. No. 27) and 19-chloro-Δ⁵-androstene-3β,17β-diol dipropionate (cpd. No. 28).

*Example XIV*

When the compounds Nos. 5 to 10, inclusive, were treated following the procedure of Example XII, there were obtained the corresponding dicaproates.

*Example XV*

The compounds Nos. 1 and 2 were treated according to Example IX, thus affording respectively: 19-fluoro-Δ⁵-androsten-3β-ol-17-one (cpd. No. 29) and 19-chloro-Δ⁵-androsten-3β-ol-17-one (cpd. No. 30).

I claim:

1. A compound of the following formula:

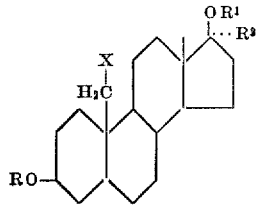

wherein R and R¹ are selected from the group consisting of hydrogen and a hydrocarbon carboxylic acyl group of less than 12 carbon atoms; R² is selected from the group consisting of hydrogen, lower alkyl, lower alkenyl and lower alkinyl; and X is a member of the group consisting of fluorine and chlorine.

2. 19-fluoro-Δ⁵-androstene-3β,17β-diol.
3. 19-chloro-Δ⁵-androstene-3β,17β-diol.
4. 19-fluoro-17α-methyl-Δ⁵-androstene-3β,17β-diol.
5. 19-chloro-17α-methyl-Δ⁵-androstene-3β,17β-diol.
6. 19-fluoro-17α-vinyl-Δ⁵-androstene-3β,17β-diol.
7. 19-chloro-17α-vinyl-Δ⁵-androstene-3β,17β-diol.
8. 19-fluoro-17α-ethinyl-Δ⁵-androstene-3β,17β-diol.
9. 19-chloro-17α-ethinyl-Δ⁵-androstene-3β,17β-diol.
10. A compound of the following formula:

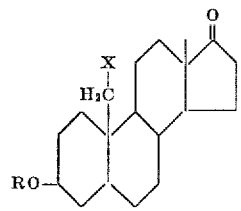

wherein R is selected from the group consisting of hydrogen and a hydrocarbon carboxylic acyl group of less than 12 carbon atoms; and X is a member of the group consisting of fluorine and chlorine.

11. 19-fluoro-Δ⁵-androsten-3β-ol-17-one.
12. 19-chloro-Δ⁵-androsten-3β-ol-17-one.

References Cited in the file of this patent

Mills et al.: Chemistry and Industry, June 24, 1961, page 946.

UNITED STATES PATENT OFFICE
CERTIFICATE OF CORRECTION

Patent No. 3,101,357            August 20, 1963

Albert Bowers

It is hereby certified that error appears in the above numbered patent requiring correction and that the said Letters Patent should read as corrected below.

Column 5, lines 35 to 45, the formula should appear as shown below instead of as in the patent:

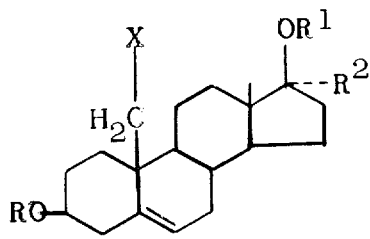

column 6, lines 17 to 25, the formula should appear as shown below instead of as in the patent:

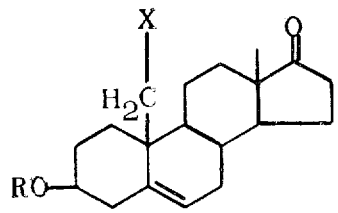

Signed and sealed this 7th day of Apirl 1964.

(SEAL)
Attest:
ERNEST W. SWIDER
Attesting Officer

EDWARD J. BRENNER
Commissioner of Patents